UNITED STATES PATENT OFFICE.

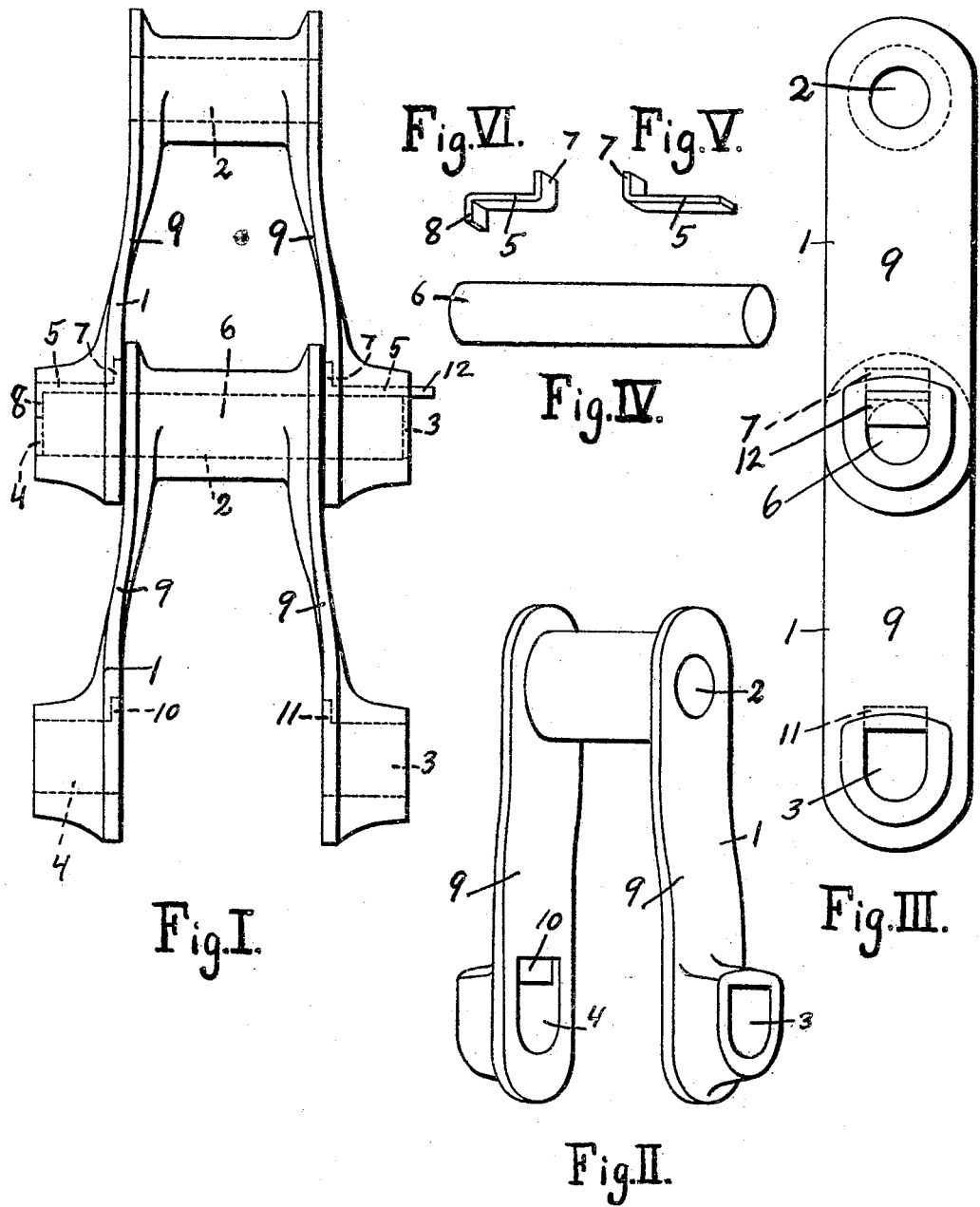

WILLIAM H. TROUT, OF MILWAUKEE, WISCONSIN.

CHAIN.

932,919.   Specification of Letters Patent.   Patented Aug. 31, 1909.

Application filed February 8, 1907, Serial No. 356,444. Renewed June 1, 1908. Serial No. 435,907.

*To all whom it may concern:*

Be it known that I, WILLIAM H. TROUT, a subject of the King of Great Britain, residing at Milwaukee, in the county of Milwaukee and State of Wisconsin, have invented a certain new and useful Chain, of which the following is a specification.

This invention relates to chains of that type made up of separable links, and has for its object to provide a cheap, convenient, practical and easily adjustable means for retaining a connecting pin in position so that it can be readily removed, while at the same time the pin is left free to revolve in its seat so that the wear on the pin will be evenly distributed around its surface and not confined to one side thereof.

In the drawings which accompany this specification and form a part thereof and on which the same elements are indicated by the same reference characters in each of the several views,—Figure 1 represents in elevation two links of a chain secured together by a pin and disclosing the subject matter of this invention. Fig. 2 represents a perspective view of a single link. Fig. 3 represents a side elevation of the two links as shown by Fig. 1. Fig. 4 represents a perspective of the coupling pin. Fig. 5 represents a perspective of one of the retaining clips. Fig. 6 represents a perspective of the other retaining clip.

The chain shown is composed of links of a form that are ordinarily used in drive chains, and the purpose of this invention is to provide means for coupling said links together to form a chain, said means permitting the use of a very hard steel pin which is allowed to rotate under the turning action of the links of the chain where the chain passes around pulleys or sprocket wheels, while at the same time extremely simple, cheap and serviceable means are provided for retaining the pin in position in the links.

The numeral 1 designates a chain link of any preferred or ordinary type, it being provided with the customary apertures 2, 3 and 4 for the reception of pins. The apertures 3 and 4 in the execution of this invention, instead of being formed circular in cross section similar to aperture 2, are formed semi-circular and then rectangular, this form admitting the placing of a key 5 within the rectangular portion of either of said apertures, while at the same time allowing the pin 6 to be freely received within said apertures.

The pin 6 is preferably made shorter than the width of the chain through the apertures 3 and 4, and preferably twice the thickness of the key 5.

The keys are preferably formed from a flat piece of steel and one end is bent over at right angles to the main body portion forming a stop 7. Ordinarily these keys will be furnished in the two forms shown by Figs. 5 and 6, that is, one will have a part turned over at right angles forming a stop 7, while the other will have a part turned over at right angles forming the stop 7 and the other end turned over likewise at right angles but in the opposite direction from the first, as indicated at 8. The inside of the legs 9 of the links 1 are recessed adjacent to the apertures 3 and 4, said recess being of a size sufficient to receive a stop 7 on one of the keys 5.

The operation of assembling the chain is as follows: One of the keys 5 provided both with the stop 7 and the turned over end 8, is inserted within the aperture 4, for example, with the stop 7 received within the recess 10. A second key 5 is placed within the aperture 3 with its stop 7 seated in the recess 11. A link is brought into position with its aperture 2 registering with apertures 3 and 4, and a pin 6 is inserted in aperture 3 through aperture 2 of the adjacent link and into aperture 4 until its end contacts with the turned over end 8 of the key, the position of the several parts when thus assembled being shown by Fig. 1 of the drawings. The projecting end 12 of the key 5 which is now stationarily mounted in one of the legs 9, forms a projection from that leg. The projecting end 12 of the key 5 is now bent down against the free end of the pin 6, thereby holding the pin in place but allowing the pin to turn freely so that the wear is distributed around the entire circumference of the pin.

If it becomes necessary to remove a link or pin, or take the chain apart, it is only necessary to bend up the turned over end 8, or the end 12 of a key, when the pin 6 can be readily pushed or driven out.

What I claim is,—

1. The combination with the adjacent links of a chain, each of said links being provided with apertures which register, of pins adapted to be received within said apertures to unite said links to form a chain, and retaining members each provided with a stop and adapted to be seated in an aperture of one of said links with its stop engaged with said link and an end adapted to be bent over the end of a pin to retain said pin within the apertures of said links.

2. The combination with the links 1, provided with the apertures 2, 3 and 4, of the cylindrical pin 6 adapted to be received within the apertures 3 and 4 of one link, and the aperture 2 of an adjacent link, to unite said links to form a chain, said links being recessed adjacent said apertures 3 and 4 to receive stops 7 on keys 5, two keys 5, one of the keys being provided with a bent-over portion 8 against which the end of pin 6 is adapted to rest when said key 5 is received within an aperture with its stop 7 seated in the recess adjacent said aperture, the other of said keys 5 having an end which extends beyond the opposite end of pin 6 when said key is placed in its aperture with its stop 7 received within the recessed portion adjacent thereto, said extended end being adapted to be bent over the end of pin 6 to retain said pin within said apertures.

3. A chain link provided with legs, said legs being provided with apertures adapted to receive a pin to unite said link with another link to form a chain, one of said legs on the inside thereof and adjacent the aperture therein being provided with a recess adapted to receive a stop on a key which is adapted to extend through said aperture, whereby the key is prevented from end displacement toward the outside of said leg.

4. A chain link provided with legs, said legs being provided with apertures, a pin free to turn coacting with said apertures to unite said link with another link to form a chain, and a key stationarily mounted in one of said legs whereby the pin is prevented from end displacement.

5. A chain link provided with legs, said legs being provided with apertures, a pin freely coacting with said apertures to unite said link with another link to form a chain, and a projection from one of said legs having a portion thereof forced into position to prevent end displacement of the pin, by straining the material of the projection so as to receive a permanent set.

In testimony whereof, I affix my signature in the presence of two witnesses.

WILLIAM H. TROUT.

Witnesses:
H. C. CASE,
FRANK E. DENNETT.